(No Model.)
F. HEILBORN.
EYEGLASSES.
No. 564,518.      Patented July 21, 1896.
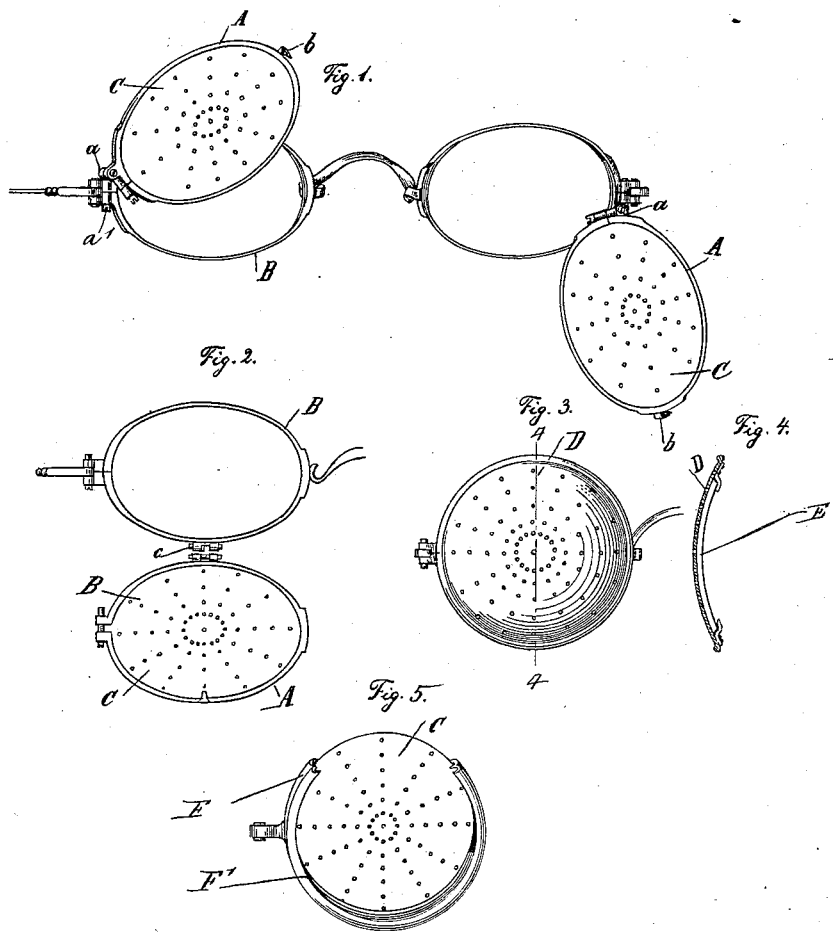
WITNESSES.
A. Lurcott
John Lotka
INVENTOR:
F. Heilborn
BY
Munn & Co.
ATTORNEYS.

UNITED STATES PATENT OFFICE.

FRANZ HEILBORN, OF BRESLAU, GERMANY.

EYEGLASSES.

SPECIFICATION forming part of Letters Patent No. 564,518, dated July 21, 1896.

Application filed August 15, 1895. Serial No. 559,404. (No model.)

*To all whom it may concern:*

Be it known that I, FRANZ HEILBORN, a subject of the King of Prussia, Emperor of Germany, and a resident of Breslau, in the Province of Silesia, Kingdom of Prussia, Empire of Germany, have invented and produced new and Improved Eyeglasses, of which the following is a full, clear, and exact description.

Reference is to be had to the accompanying drawings, forming a part of this specification, in which similar characters of reference indicate corresponding parts in all the figures.

Figure 1 is an elevation showing spectacles provided with my improvements. Fig. 2 is a broken elevation of another form of my invention. Fig. 3 is a similar view of a further form of construction. Fig. 4 is a sectional elevation on the line 4 4 of Fig. 3, and Fig. 5 illustrates another embodiment of the invention.

The object of my invention is to provide spectacles or eyeglasses of such a construction that persons suffering from strong myopia will have their sight so improved as to be enabled to read with weak glasses at a distance of about one foot, (thirty-three centimeters,) while persons suffering from primary irregular astigmatism will be enabled to read at the same distance without glasses.

The strong concave glasses which are still quite often employed as a corrective for advanced states of myopia are open to serious objections. The images produced on the retina are reduced and distorted and in general are irregular, this defect increasing with the strength of the glasses. The eyes very often are injured by such glasses, the retina becoming loose in places and hemorrhages taking place in the eyeball. Another defect of such glasses is that they strain the accommodation-muscles and the internal recti at close sight.

The object of the present invention is to remedy these defects to such a degree as to afford the patients a good sight at the distance of about one foot, which is ordinarily required for work.

The invention comprises a plate having a series of fine apertures and is intended for use in cases of myopia amounting to ten to twenty diopters.

Various means may be employed for carrying the invention into effect.

In Fig. 1 I have shown spectacles having a frame B, which may be of substantially the usual construction, and to which is pivoted at $a$ an auxiliary frame A, provided with a hook $b$, adapted to catch on the bridge. In the auxiliary frame A is set a plate C, having a series of fine holes which preferably are arranged in concentric or radiating series, but they may be arranged differently and need not be of equal sizes or distances, nor do they need to be spaced at a distance at least equal to the diameter of the pupil. The plate C is ordinarily made of thin sheet-brass or German silver. The pivot-pin $a$ may be taken out and reversed, so as to bring the plate C from the front of the glass proper to the rear thereof. If desired, the pivot $a$ may be secured to the frame B through the medium of a hinge $a'$, so as to permit the auxiliary frame A, with the plate C, to be swung forward so as to stand at an angle to the plane of the glass.

As illustrated in Fig. 2, the auxiliary frame A is pivoted or hinged at $c$ to the main frame B at the central portion of one of the glass-receiving loops or rings, and owing to this arrangement the auxiliary frame A, with the plate C set therein, may be readily brought against either the front or the rear side of the glass held in the main frame B.

The perforated plate may be either plane, as shown at C in Figs. 1 and 2, or concavo-convex, as shown at D in Figs. 3 and 4, or otherwise curved. Fig. 4 represents the glass E fitted into the concave side of the plate D.

Fig. 5 illustrates an arrangement comprising two rings F F', recessed or grooved on their inner surface to receive the edges of the plate C and of the glass respectively, said plate and glass fitting removably into either of the rings F or F', so that the plate may be set in front or rear of the glass. This arrangement is intended for the use of physicians in trying various sets of glasses and plates for the purpose of ascertaining the exact glasses and plates wanted by the patient.

With respect to the action of my improved glasses I would observe that it is materially superior to that of the well-known stenopaic eyeglasses, since the marginal rays of light are partly excluded and the circles of aberration eliminated, and in addition to this the sight is considerably improved by the correction or elimination of another serious defect of sight—viz., irregular astigmatism. This may be accounted for in the following manner: It is well known that with advancing myopia there is a distortion of the cornea in all its parts owing to the increase or growth of the eyeball in length, and it will be obvious that such distortion will become worse as the length of the eyeball increases. It follows that in almost every case of advanced myopia irregular astigmatism will be observed. Since the latter affection mainly impairs the sight in cases of advanced myopia and irregular astigmatism, if present alone, can be corrected or completely eliminated by the improved eyeglasses, it will be evident that with persons suffering from myopia of a high degree the sight can be materially improved and the distance of distinct vision can be increased to its normal value of about one foot. The more advanced the case of myopia is the greater will be the corrective influence of such eyeglasses, and I have also found that they are readily accepted by the patients. The glasses need not be stronger than five or six diopters.

It will be understood that a good light is indispensable when working with my improved eyeglasses, and it is also well known that good light is a requirement of hygiene, and the patient therefore with my improved eyeglasses will necessarily observe this requirement. The apparatus also is of value in the diagnosis of the case, as the physician is enabled to ascertain by an examination how much irregular astigmatism can be eliminated. I have found that the best corrective influence is obtained with patients suffering from advanced myopia yet retaining more or less a clear sight.

It will be understood that my invention is applicable to eyeglasses of various descriptions, monocular as well as binocular.

Having thus described my invention, I claim as new and desire to secure by Letters Patent—

1. Eyeglasses comprising the glass proper, and a perforated plate pivoted or hinged thereto at the margin so as to be capable of being swung clear of the glass, substantially as described.

2. Eyeglasses comprising the glass proper, and a perforated plate completely covering the same, substantially as described.

3. Eyeglasses comprising the glass proper, and a perforated plate on one side thereof, substantially as described.

4. Eyeglasses comprising the glass proper, and an opaque perforated plate on one side thereof, substantially as described.

5. Eyeglasses comprising the glass proper, and a perforated plate pivoted or hinged thereto, substantially as described.

6. Eyeglasses comprising a concavo-convex plate having a series of through-apertures, and the glass proper fitted on the concave side of said plate, substantially as described.

In witness whereof I have hereunto set my hand in presence of two witnesses.

FRANZ HEILBORN.

Witnesses:
PEREGRINE VARNALS,
WILHELM SCHWIETHAL.